(12) United States Patent  
Kurosawa (10) Patent No.: US 7,005,631 B2  
(45) Date of Patent: Feb. 28, 2006

(54) BEAM POSITION ADJUSTING METHOD FOR OPTICAL SCANNING DEVICE

(75) Inventor: Norio Kurosawa, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 350 days.

(21) Appl. No.: 10/414,003

(22) Filed: Apr. 16, 2003

(65) Prior Publication Data

US 2003/0197118 A1    Oct. 23, 2003

(30) Foreign Application Priority Data

Apr. 18, 2002 (JP) .............................. 2002-116214

(51) Int. Cl.
   *G02B 26/08* (2006.01)
(52) U.S. Cl. ...................... 250/234; 250/235; 347/250; 359/212
(58) Field of Classification Search ........ 250/234–236; 358/475, 481, 486, 514; 347/234–236, 241, 347/246, 248, 250, 256; 359/212–226
See application file for complete search history.

(56) References Cited

U.S. PATENT DOCUMENTS

| | | | | |
|---|---|---|---|---|
| 5,929,891 A | * | 7/1999 | Komiya et al. | ............. 347/235 |
| 5,995,246 A | * | 11/1999 | Komiya et al. | ............. 358/481 |
| 6,462,855 B1 | * | 10/2002 | Komiya et al. | ............. 359/212 |

FOREIGN PATENT DOCUMENTS

JP           2001-091872 A       4/2001

\* cited by examiner

*Primary Examiner*—Stephone B. Allen  
(74) *Attorney, Agent, or Firm*—Foley & Lardner LLP (57) ABSTRACT

A CPU first detects a position of a stationary laser beam using a beam position detection sensor, and then determines a target position of a movable laser beam relative to the stationary laser beam. The CPU effects a control to approach the movable laser beam to the target position in predetermined steps. When the CPU moves the movable laser beam, it checks whether the movable laser beam has moved to the target position. If the movable laser beam has not moved to the target position, the CPU performs a control once again to perform the first detection of the position of the stationary laser beam.

11 Claims, 6 Drawing Sheets

BEAM POSITION ADJUSTING METHOD FOR OPTICAL SCANNING DEVICE

CROSS-REFERENCE TO RELATED APPLICATIONS

This application is based upon and claims the benefit of priority from the prior Japanese Patent Application No. 2002-116214, filed Apr. 18, 2002, the entire contents of which are incorporated herein by reference.

BACKGROUND OF THE INVENTION

1. Field of the Invention

The present invention relates to a beam position adjusting method for an optical scanning device used in, e.g. an electrophotographic digital copying machine.

2. Description of the Related Art

In the technical field of image forming apparatuses such as high-speed digital copying machines and high-speed printers, there is known an optical scanning device using, e.g. a multi-beam exposure device which simultaneously scans two or more beams and exposes a charged area on a photosensitive drum.

The multi-beam exposure device comprises, for example, a plurality of semiconductor laser elements for emitting laser beams; an optical member for adjusting the cross-sectional beam dimensions of the laser beams emitted from the semiconductor laser elements in accordance with a required resolution and setting an inter-beam distance between the laser beams in a sub-scan direction (a direction perpendicular to the axis of the photosensitive drum); a deflection device for deflecting and scanning the laser beams together in a main scan direction (an axial direction of the photosensitive drum); and a focusing lens system for guiding and focusing the laser beams deflected by the deflection device on a charged area on the photosensitive drum.

A galvano-mirror is used as an optical member used in the multi-beam exposure device. The galvano-mirror can minutely alter the angle of the mirror surface by controlling current supplied to an electromagnetic coil.

For example, in a multi-beam exposure device that simultaneously scans two laser beams, that is, a stationary laser beam and a movable laser beam, the angle of the mirror surface of the galvano-mirror is finely adjusted to control the distance (or the position) of the movable laser beam in the sub-scan direction.

The adjustment of the distance is effected by using a sensor such as a photodiode. Specifically, a laser beam is caused to scan the light-receiving surface of the sensor and a position on the light-receiving surface, at which the laser beam passes, is detected. This operation is performed for each laser beam. Thus, the distance between the laser beams is detected, and is adjusted based on the detection result.

The position of the stationary laser beam in the sub-scan direction is fixed and, theoretically, it does not vary. However, due to a variation in temperature, voltage or the like, the position may vary. In such a case, an inter-beam distance between the stationary laser beam and movable laser beam may deviate from a set value, leading to such a problem that precise beam scanning cannot be performed.

BRIEF SUMMARY OF THE INVENTION

The object of the present invention is to provide a beam position adjusting method for an optical scanning device, which is able to perform precise positional adjustment between a stationary light beam and a movable light beam and to perform precise beam scanning.

In order to achieve the object, the present invention may provide a beam position adjusting method for an optical scanning device using a galvano-mirror capable of altering an angle of a mirror surface by a drive control, and using a sensor that detects passage positions of a stationary light beam whose scanning position is fixed and a movable light beam whose scanning position is varied by adjusting the angle of the mirror surface of the galvano-mirror, the method comprising: detecting a passage position of the stationary light beam on a light-receiving surface of the sensor; determining a passage position of the movable light beam on the light-receiving surface of the sensor, relative to the detected passage position of the stationary light beam; effecting a control to move the movable light beam to the determined passage position by adjusting the angle of the mirror surface of the galvano-mirror; checking, upon completion of the control to move the movable light beam to the determined passage position, whether the movable light beam has moved to the determined passage position; and detecting once again the passage position of the stationary light beam, when the movable light beam has failed to move to the determined passage position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
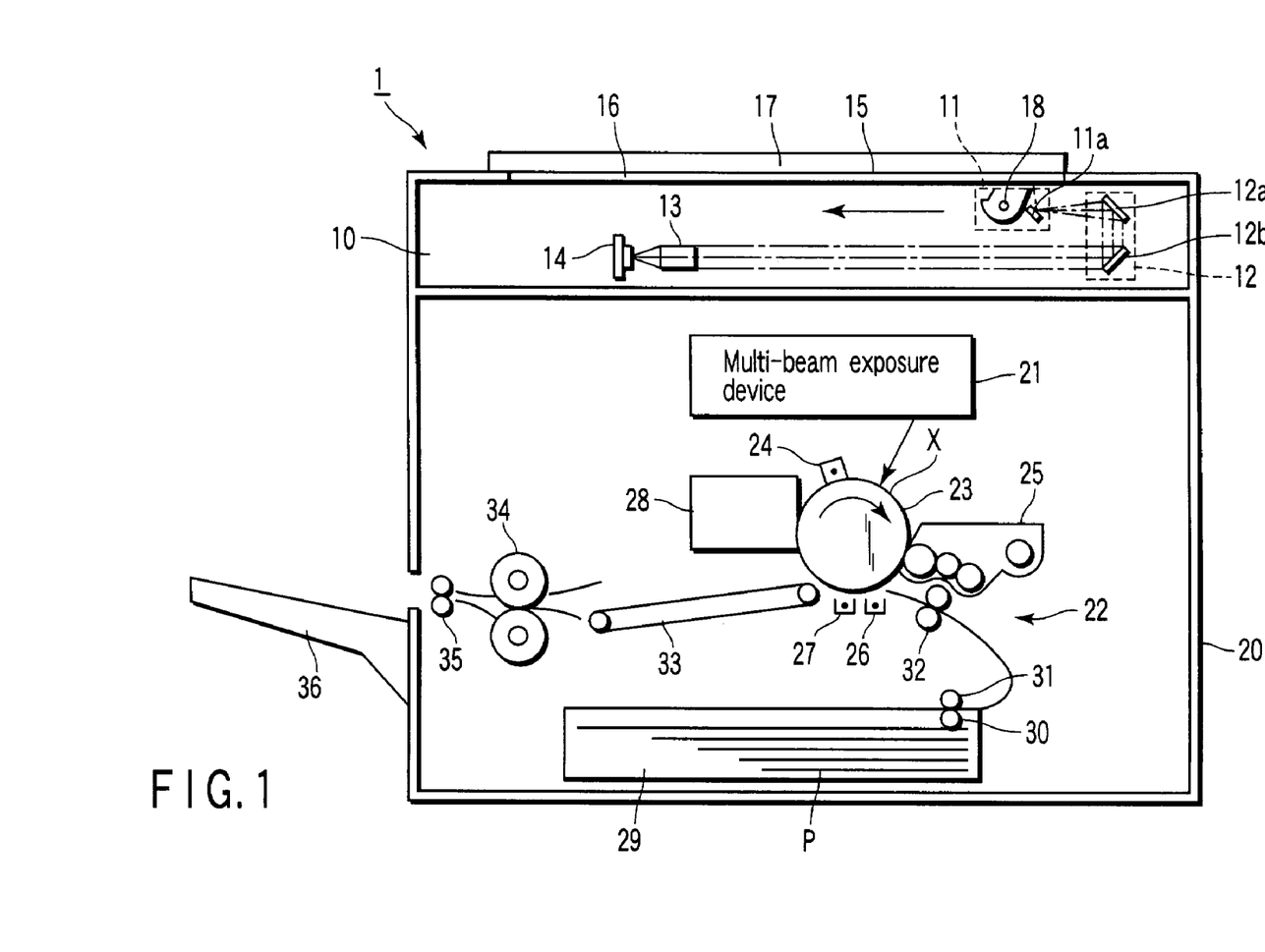
FIG. 1 schematically shows the structure of a digital copying machine having a multi-beam exposure device according to an embodiment of the present invention.

FIG. 1 schematically shows the structure of an image forming apparatus, that is, a digital copying machine 1, using a multi-beam exposure device as an optical scanning device. The digital copying machine 1 comprises a scanner section 10 and a printer section 20.

The scanner section 10 includes a first carriage 11, a second carriage 12, an optical lens 13, a photoelectric conversion element 14, an original table 16 and an original hold cover 17.

The first carriage 11 is formed movable in the direction of the arrow.

The second carriage 12 follows the movement of the first carriage 11.

The optical lens 13 imparts predetermined focusing characteristics to light emanating from the second carriage 12.

The photoelectric conversion element 14, such as a CCD sensor, photoelectrically converts the light provided with the predetermined focusing characteristics by the optical lens 13, thus producing an electric signal.

The original table 16 serves for placement of the original 15.

The original hold cover 17 holds the original 15 on the original table 16.

The first carriage 11 is provided with a light source 18 for illuminating the original 15, and a mirror 11a for deflecting reflective light from the original 15, which is illuminated with light from the light source 18, toward the second carriage 12.

The second carriage 12 is provided with a mirror 12a for deflecting the light from the mirror 11a of first carriage 11 by 90°, and a mirror 12b for further deflecting the light from the mirror 12a by 90°.

The original 15 placed on the original table 16 is illuminated by the light source 18, and reflects light having a dark/light distribution corresponding to the presence/absence of an image. The reflective light from the original 15 is made incident on the optical lens 13 as image information via the mirrors 11a, 12a and 12b. The incident light on the optical lens 13 from the original 15 is converged through the optical lens 13 on the light receiving surface of the photoelectric conversion element 14. The first carriage 11 and second carriage 12 move along the original table 16 at a relative speed with a ratio of 2:1. Thereby, the image information on the original 15 is read by the photoelectric conversion element 14 and converted to a digital signal representative of the density of the image.

The printer section 20 comprises a multi-beam exposure device 21 and an image forming section 22 for forming an image on a recording paper sheet P by an electrophotographic method.

The image forming section 22 includes a photosensitive drum 23, a charger 24, a developing device 25, a transfer device 26, a separator 27 and a cleaning device 28.

The photosensitive drum 23 is a drum-shaped photosensitive body having a surface formed of a photosensitive layer.

The charger 24 charges the surface of the photosensitive drum 23 with a potential of a predetermined polarity.

The developing device 25 applies a toner to, and develops, an electrostatic latent image formed on the surface of the photosensitive drum 23 by the multi-beam exposure device 21.

The transfer device 26 applies a predetermined electric field to the developed toner image formed by the developing device 25, and transfers the toner image onto the recording paper sheet P.

The separator 27 separates the recording paper sheet P with the transferred toner image from the photosensitive drum 23.

The cleaning device 28 removes the untransferred residual toner left on the surface of the photosensitive drum 23 after the transfer step, and restores the potential distribution on the photosensitive drum 23 to the pre-charging state.

The charger 24, developing device 25, transfer device 26, separator 27 and cleaning device 28 are arranged in the named order in the rotational direction of the photosensitive drum 23 (as indicated by the arrow). Laser beams from the multi-beam exposure device 21 are applied to a predetermined position X between the charger 24 and developing device 25.

In an image processing section (not shown), the image signal corresponding to the original 15 read by the scanner section 10 is subjected to, e.g. contour correction and tone processing for halftone display, and thus converted to a print signal. The print signal is, in turn, converted to a laser modulation signal for modulating the light intensity of laser beams emitted from semiconductor laser elements of the multi-beam exposure device 21.

The laser beams from the multi-beam exposure device 21 form an electrostatic latent image corresponding to the image signal at a predetermined position X on the photosensitive drum 23. As the photosensitive drum 23 is rotated, the electrostatic latent image is supplied with toner from the developing device 25 and developed. Further, the developed toner image is brought to a position facing the transfer device 26.

On the other hand, a recording paper sheet P is taken out of a sheet cassette 29 by means of a paper feed roller 30 and a separating roller 31. The recording paper sheet P is aligned and time-adjusted by an aligning roller 32 and conveyed to a position where the transfer device 26 faces the photosensitive drum 23.

The toner image formed on the photosensitive drum 23 is transferred onto the recording paper sheet P by an electric field applied from the transfer device 26.

The recording paper sheet P, on which the toner image has been transferred, is separated from the photosensitive drum 23 by the separator 27 and conveyed to a fixing device 34 by means of a convey unit 33. The recording paper sheet P, which has come to the fixing device 34, is heated and pressed so that the toner on the paper sheet P is fixed. The paper sheet P with the fixed toner image is output to a tray 36 by means of output rollers 35.

On the other hand, after the toner image has been transferred from the photosensitive drum 23 by the transfer device 26, the untransferred residual toner left on the surface of the photosensitive drum 23 is removed by the cleaning device 28. Thereby, the surface potential on the photosensitive drum 23 is restored to the pre-charged initial level in preparation for the next image forming operation.

The above-described process is repeated to effect successive image formation.

Figure 2:
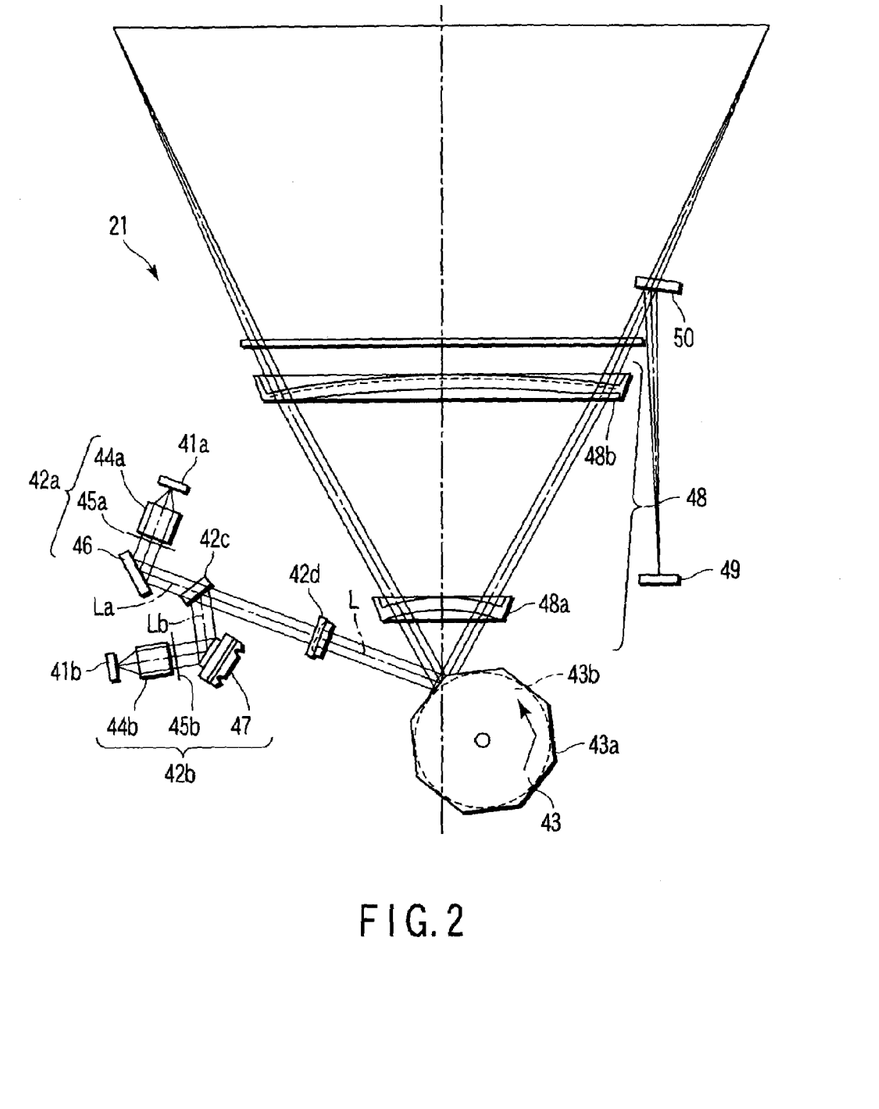
FIG. 2 is a plan view showing an optical path of laser beams in the multi-beam exposure device according to the embodiment, the optical path being developed on the same plane.

As is shown in FIG. 2, the multi-beam exposure device 21 includes semiconductor laser elements 41a and 41b as light beam generating sources. FIG. 2 shows the multi-beam exposure device 21 in the state in which the optical path of laser beams is developed on the same plane, with the housing (body frame) and some mirrors being omitted.

The semiconductor laser elements 41a and 41b emit laser beams La and Lb with predetermined wavelengths. The laser beams La and Lb pass through pre-deflection optical systems 42a and 42b and reach a deflection device 43 having a polygon mirror 43a. Specifically, the laser beam La passes through the pre-deflection optical system 42a and then passes through a half-mirror 42c and a cylinder lens 42d that effects convergence in a sub-scan direction. Thus, the laser beam La is guided to the deflection device 43 having the polygon mirror 43a. On the other hand, the laser beam Lb passes through the pre-deflection optical system 42b and is then reflected by the half-mirror 42c. The reflected laser beam Lb passes through the cylinder lens 42d and reaches the deflection device 43 having the polygon mirror 43a.

The pre-deflection optical system 42a adjusts the cross-sectional spot shape of the laser beam La from the semiconductor laser element 41a into a predetermined shape. The pre-deflection optical system 42a comprises a finite focus lens 44a, a stop 45a and a reflection mirror 46.

The finite focus lens 44a effects predetermined convergence of the divergent laser beam from the semiconductor laser element 41a.

The stop 45a adjusts the cross-sectional beam shape of the laser beam, which emanates from the finite focus lens 44a, into a predetermined shape.

The reflection mirror 46 deflects the laser beam from the stop 45a towards the half-mirror 42c.

The pre-deflection optical system 42b adjusts the cross-sectional spot shape of the laser beam Lb from the semiconductor laser element 41b into a predetermined shape. The pre-deflection optical system 42b comprises a finite focus lens 44b, a stop 45b and a galvano-mirror 47.

The finite focus lens 44b effects predetermined convergence of the divergent laser beam from the semiconductor laser element 41b.

The stop 45b adjusts the cross-sectional beam shape of the laser beam, which emanates from the finite focus lens 44b, into a predetermined shape.

The galvano-mirror 47 deflects the laser beam from the stop 45b towards the half-mirror 42c, and also adjusts the beam positions such that the two laser beams La and Lb have a predetermined inter-beam distance in the sub-scan direction.

The finite focus lens 44a, 44b is, for example, a single lens formed by attaching an ultraviolet-curing plastic aspherical lens to an aspherical glass lens or a spherical glass lens. The galvano-mirror 47 is a mirror with an optical path altering device that can slightly change the direction of reflection of the laser beam to a desired direction.

The two laser beams La and Lb reflected by the reflection mirror 46 and galvano-mirror 47 are joined via the half-mirror 42c, and the two joined laser beams L (La+Lb), which have a predetermined inter-beam distance in the sub-scan direction, are guided through the cylinder lens 42d to the deflection device 43.

The deflection device 43 is configured such that a polygon mirror having, e.g. eight planar reflection mirrors on its peripheral sides is rotated at a predetermined speed by a motor 43b.

A post-deflection optical system 48 is disposed between the deflection device 43 and an image surface (a focal plane in design at a position facing a predetermined position X on photosensitive drum 23). The post-deflection optical system 48 comprises first and second focusing lenses 48a and 48b which imparts predetermined optical characteristics to the laser beams L from the deflection device 43.

A beam position detection sensor 49 and a reflection mirror 50 are also disposed. The beam position detection sensor 49 detects the timing of passing and the position of passing of the laser beams L emanating from the second focusing lens 48b, before the laser beams L scans an image formation region at the predetermined position X on the photosensitive drum 23. The reflection mirror 50 reflects the laser beams L, which come out of the second focusing lens 48b, and guides them to the beam position detection sensor 49. The beam position detection sensor 49 is disposed such that the light receiving surface thereof and the surface of the photosensitive drum 23 are positioned at an equal optical distance.

Figure 3:
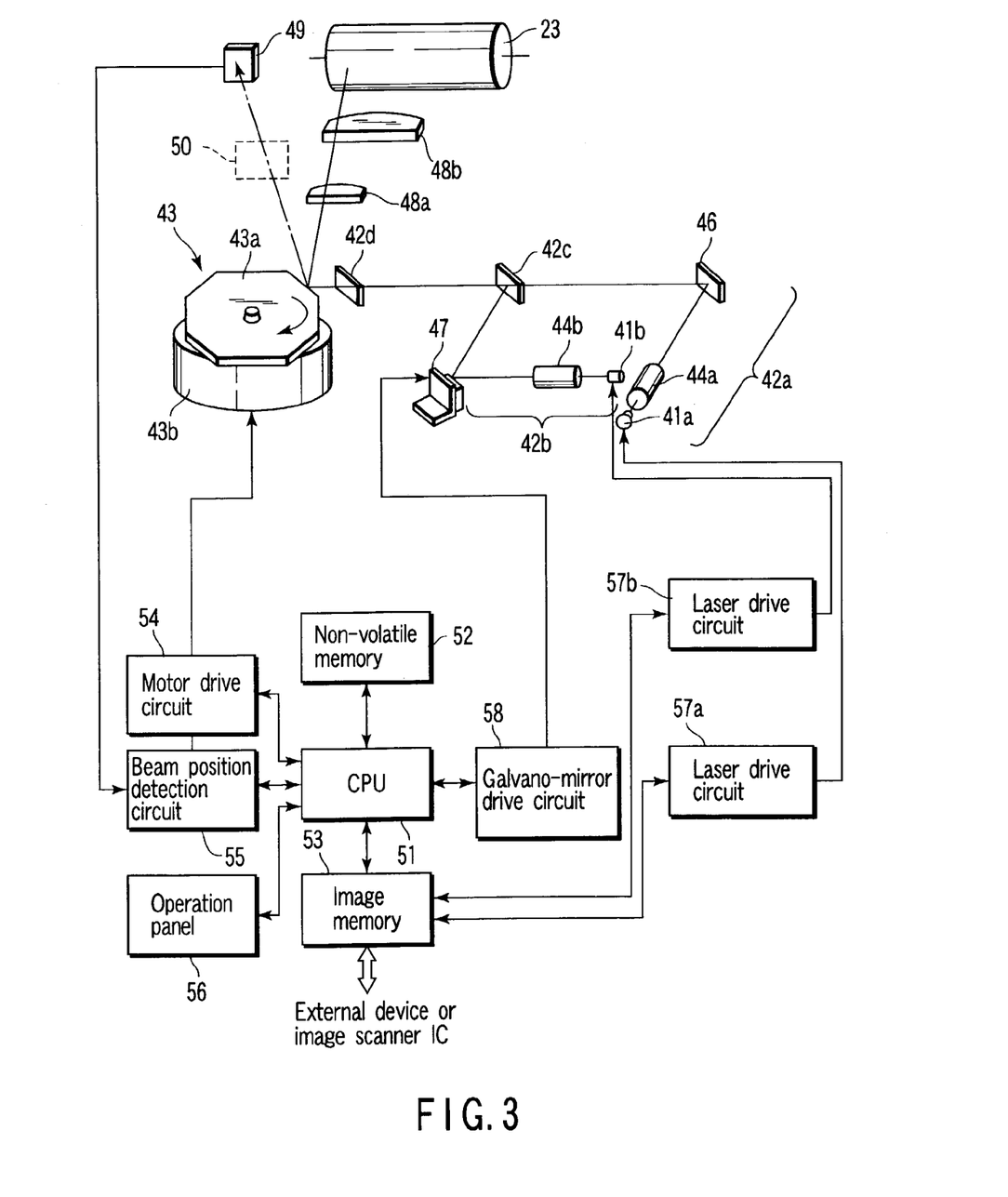
FIG. 3 is a view, including some blocks, for illustrating the structure of a control section in the multi-beam exposure device according to the embodiment.

FIG. 3 is a view, including some blocks, for illustrating the structure of a control section in the multi-beam exposure device 21 according to the embodiment. The control section of the multi-beam exposure device 21 includes a CPU (Central Processing Unit) 51 for controlling the entirety of the device 21. The CPU 51 writes/reads out data in/from a non-volatile memory 52 and an image memory 53.

The CPU 51 controls a motor driving circuit 54 that controls driving of the motor 43b of deflection device 43; a beam position detection circuit 55 that receives a detection signal from the beam position detection sensor 49, thereby detecting a beam position; and an operation panel 56.

The CPU 51 also controls laser drive circuits 57a and 57b for driving the semiconductor laser elements 41a and 41b; and a galvano-mirror drive circuit 58 having a D/A converter for driving the galvano-mirror 47.

The semiconductor laser elements 41a and 41b are driven by the laser drive circuits 57a and 57b and emit laser beams La and Lb at a predetermined timing on the basis of image data stored in the image memory 53.

In this case, the laser beams are not emitted until the rotation speed of the polygon mirror 43a of deflection device 43 reaches a predetermined value. When the rotation speed of the polygon mirror 43a has reached the predetermined value, the CPU 51 outputs predetermined control commands to the laser drive circuits 57a and 57b. Upon receiving the predetermined control commands, the laser drive circuits 57a and 57b drive the semiconductor laser elements 41a and 41b. When laser drive currents have reached predetermined values, the semiconductor laser elements 41a and 41b emit laser beams La and Lb.

Figure 4:
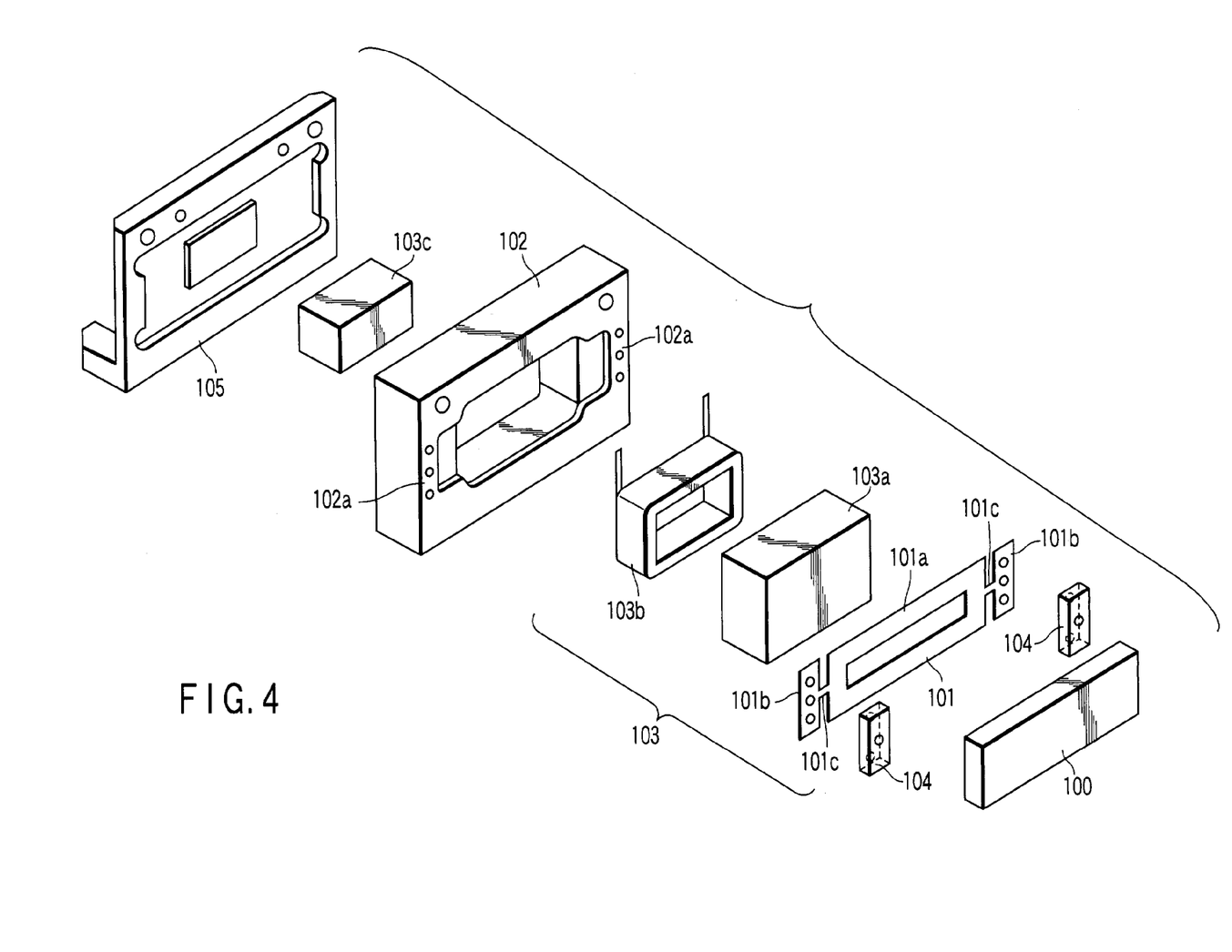
FIG. 4 is an exploded perspective view showing the structure of a galvano-mirror in the embodiment.

As is shown in FIG. 4, the galvano-mirror 47 includes a plate spring 101 for supporting a mirror 100 such that the angle of the mirror 100 is variable, and a frame 102 that supports the plate spring 101. The plate spring 101 is formed of, e.g. beryllium copper, spring stainless steel SU304, etc. The plate spring 101 is provided with a bobbin 103a and a coil 103b housed in the bobbin 103a, which constitute a thrust-producing section 103 that produces a force for altering the position of the plate spring 101.

The plate spring 101 comprises a support surface 101a on which the mirror 100 is attached; two hold surfaces 101b used for attachment to the frame 102; and two torsion bars 101c that are torsional-deformation portions for coupling each hold surface 101b and the support surface 101a. The torsion bars 101c are vertically twisted so that the plate spring 101 may vertically rotate the mirror 100.

The plate spring 101, together with spring holders 104 formed of, e.g. resin, is fixed to the frame 102 by means of screws which are driven into screw holes made in the frame 102.

The coil 103b houses a magnet 103c that generates, when current flows in the coil 103b, a magnetic field for producing a force for vertically rotating the plate spring 101 by a predetermined amount. The magnet 103c is fixed to a central portion of a fixing plate 105 that is used for fixation to a predetermined location in the exposure device body. The plate spring 101 that supports the mirror 100 is attached to the frame 102, and the frame 102 is integrally attached to the fixing plate 105.

The bobbin 103a that incorporates the magnet 103c and coil 103b is housed in the frame 102. A damping material such as silicone gel is filled in the gap between the frame 102 and bobbin 103a so as to prevent vibration of the mirror 100 due to disturbing vibration, etc. The frame 102 functions as a yoke constituting a magnetic circuit for lines of magnetic force from the magnet 103c.

The operation of the galvano-mirror 47 will now be described.

The CPU 51 delivers, e.g. an 8-bit instruction value to the galvano-mirror drive circuit 58. The galvano-mirror drive circuit 58 supplies a current of a predetermined polarity to the coil 103b of galvano-mirror 47. Thereby, an electromagnetic force is produced between the coil 103b and magnet 103c, thereby to twist the support surface 101a of plate spring 101. Thus, the mirror 100 is vertically rotated by an amount corresponding to the instruction value.

With the rotation of the mirror 100, the position in the vertical direction, i.e. in the sub-scan direction, of the laser beam reflected from the mirror surface is adjusted. The angle of the mirror 100 is kept by maintaining the current supplied to the coil 103b. The angle of rotation of the mirror 100 is determined by the instruction value from the CPU 51. In the case of the 8-bit instruction value, the angle of the mirror 100 can be controlled in 256 steps.

Figure 5:
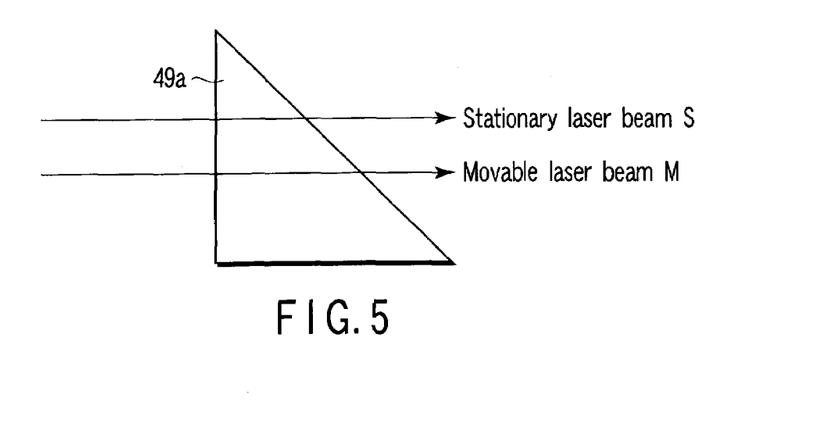
FIG. 5 shows the structure of a main part of a beam position detection sensor in the embodiment.

The beam position detection sensor 49, as shown in FIG. 5, includes a right-triangular sensor 49a. A stationary laser beam S and a movable laser beam M are made to scan a light-receiving surface of the beam position detection sensor 49a, thereby detecting their positions in the sub-scan direction. When the resolution is, for instance, 600 dpi, the distance in the sub-scan direction between the stationary laser beam S and movable laser beam M is set at 42.3 $\mu$m.

The beam position detection circuit 55 receives an output from the beam position detection sensor 49 via a current/voltage converter circuit, an amplifier circuit and an integration circuit, and ultimately binarizes the output and supplies a binary signal to the CPU 51. The output value from the sensor 49a varies from beam position to beam position, since the time of reception of the laser beam varies according to the position of the scanning beam. It is thus possible to detect the position on the light-receiving surface of the sensor 49a where the laser beam has passed, on the basis of the output value from the sensor 49a.

Figure 6:
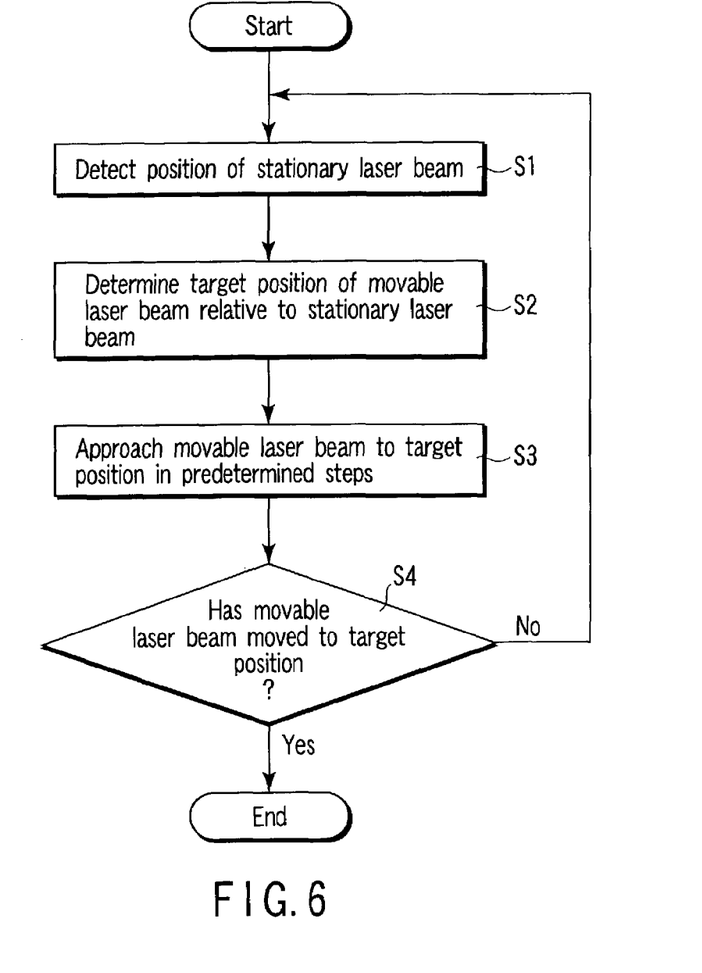
FIG. 6 is a flow chart illustrating a beam position adjusting process in the embodiment.

Referring now to a flow chart of FIG. 6, a description will be given of the operation in the above structure for adjusting the inter-beam distance between the stationary laser beam S from the semiconductor laser element 41a and the movable laser beam M from the semiconductor laser element 41b.

In the state in which the polygon mirror 43a of deflection device 43 is being rotated, the CPU 51 turns on the semiconductor laser element 41a alone, and detects a position on the light-receiving surface of sensor 49a where the stationary laser beam S passes. Thus, the position of the stationary laser beam S is detected (S1).

Next, the CPU 51 determines a target position of the movable laser beam M relative to the stationary laser beam S, to which target position the movable laser beam M is to be moved (S2). If the resolution is, e.g. 600 dpi, the target position is a position that is distant from the stationary laser beam S by 42.3 $\mu$m. Then, the CPU 51 turns on the semiconductor laser element 41b alone, adjusts the galvano-mirror 47, and effects a control to approach the movable laser beam M to the target position in predetermined steps (S3).

Subsequently, the CPU 51 determines whether the movable laser beam M has moved to the target position (S4). If the movable laser beam M has not moved to the target position, the CPU 51 returns the control routine to step S1, and repeats the processing from step S1. Upon confirming that the movable laser beam M has moved to the target position, the CPU 51 finishes the present process.

When the distance in the sub-scan direction between the stationary laser beam S and movable laser beam M is to be adjusted, the CPU 51 first detects the position of the stationary laser beam S using the sensor 49a of beam position detection sensor 49. Following this, the CPU 51 determines the target position of the movable laser beam M relative to the detected position of the stationary laser beam S, and approaches the movable laser beam M to the target position in predetermined steps.

When the CPU 51 moves the movable laser beam M in predetermined steps, the CPU 51 determines whether the movable laser beam M has reached the target position. If the movable laser beam M has not reached the target position, the CPU 51 detects the position of the stationary laser beam S once again, determines the target position of the movable laser beam M relative to the stationary laser beam S, and repeats the processing for approaching the movable laser beam M to the target position in predetermined steps.

As has been described above, each time the movable laser beam M is moved, the position of the stationary laser beam S is detected and the target position of the movable laser beam M is updated. Thus, the position adjustment between the stationary laser beam S and movable laser beam M can be performed with high precision.

For example, even if the position of the stationary laser beam S has changed due to a variation in temperature, voltage, or the like, the target position of the movable laser beam M is re-determined on the basis of the changed position of the stationary laser beam S. Therefore, the position adjustment between the stationary laser beam S and movable laser beam M can be performed with high precision.

Thereby, the digital copying machine 1 can perform an image forming operation with high-precision laser beam scanning.

In this embodiment, each time the movable laser beam M is moved, the position of the stationary laser beam S is detected and the target position of the movable laser beam M is updated. The present invention, however, is not limited to this embodiment.

Figure 7:
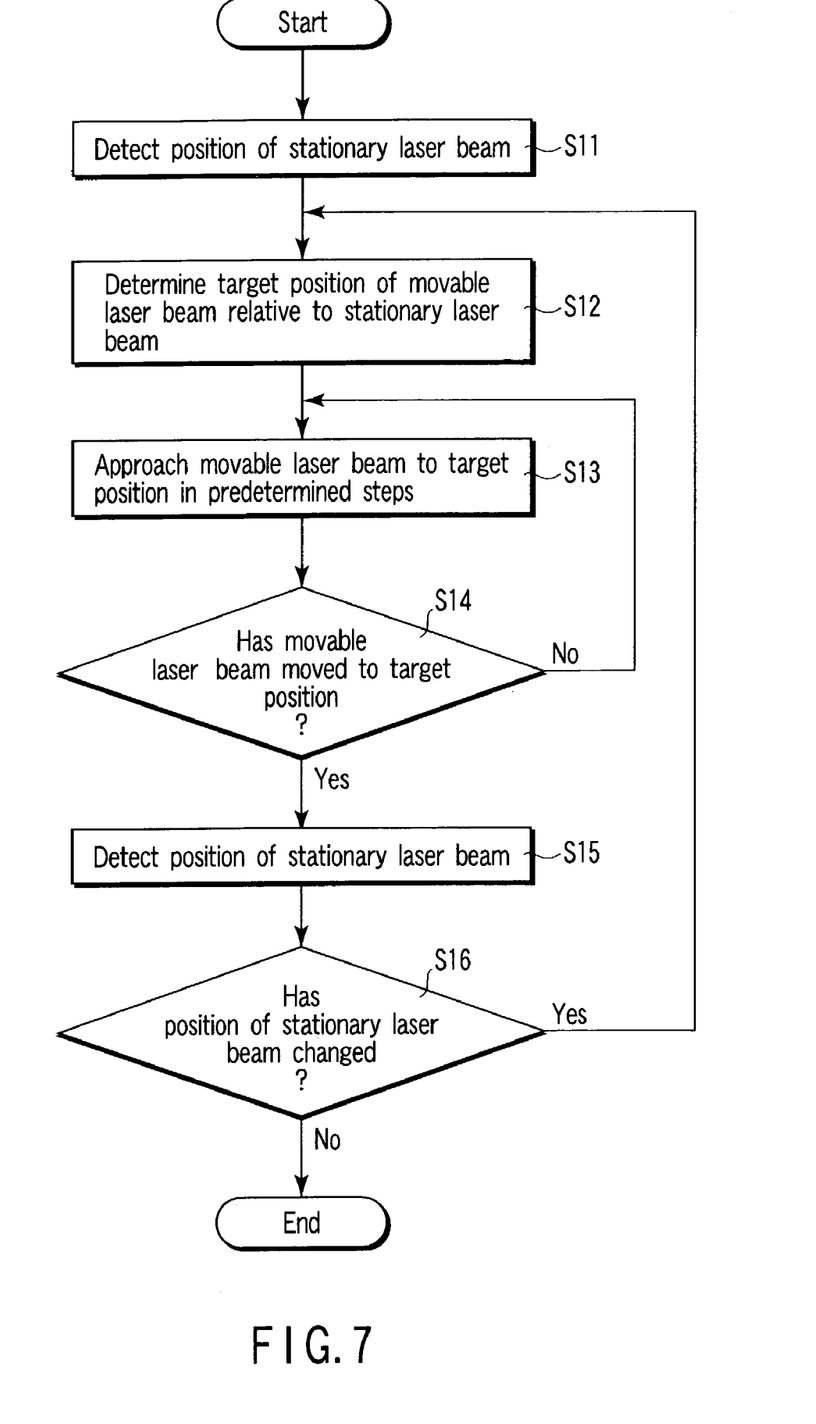
FIG. 7 is a flow chart illustrating a beam position adjusting process according to another embodiment of the present invention.

Referring to a flow chart of FIG. 7, a description will now be given of an operation for adjusting a distance between the stationary laser beam S and movable laser beam M according to another embodiment of the present invention.

In the state in which the polygon mirror 43a of deflection device 43 is being rotated, the CPU 51 turns on the semiconductor laser element 41a alone, and detects a position on the light-receiving surface of sensor 49a where the stationary laser beam S passes. Thus, the position of the stationary laser beam S is detected (S11).

Next, the CPU 51 determines a target position of the movable laser beam M relative to the stationary laser beam S, to which target position the movable laser beam M is to be moved (S12). Then, the CPU 51 turns on the semiconductor laser element 41b alone, adjusts the galvano-mirror 47, and effects a control to approach the movable laser beam M to the target position in predetermined steps (S13).

Subsequently, the CPU 51 determines whether the movable laser beam M has moved to the target position (S14). If the movable laser beam M has not moved to the target position, the CPU 51 returns the control routine to step S13, and repeats the control to approach the movable laser beam M to the target position in predetermined steps.

Upon confirming that the movable laser beam M has moved to the target position, the CPU 51 turns on the semiconductor laser element 41a alone, and detects a position on the light-receiving surface of sensor 49a where the stationary laser beam S passes. Thus, the position of the stationary laser beam S is detected (S15).

The CPU 51 checks whether the position of the stationary laser beam S has changed (S16).

If the position of the stationary laser beam S has changed in step S16, the CPU 51 returns the control routine to step S12 and repeats the processing of steps S12, S13, S14 and S15.

If the position of the stationary laser beam S remains unchanged in step S16, the CPU 51 finishes the process.

Thereby, the digital copying machine 1 can perform an image forming operation with high-precision laser beam scanning.

As has been described above, each time the movable laser beam M is moved and the movement of the movable laser beam M to the target position is completed, the position of the stationary laser beam S is confirmed once again. Thus, the position adjustment between the stationary laser beam S and movable laser beam M can be performed with high precision.

To be more specific, if the position of the stationary laser beam S is confirmed once again and it is found that that the position has changed, the target position of the movable laser beam M is determined once again and the control for moving the movable laser beam M is performed. If the position of the stationary laser beam S is confirmed once again and it is found that the position has not changed, the positions of the stationary laser beam S and movable laser beam M are determined. Accordingly, in this case, too, the position adjustment between the stationary laser beam S and movable laser beam M can be performed with high precision.

In the embodiments, laser beams are used as light beams. This invention, however, is not limited to the embodiments.

In the embodiments, the multi-beam exposure device is used as the optical scanning device. This invention, however, is not limited to the embodiments.

As has been described above, according to the embodiments of the invention, the position adjustment between the stationary laser beam and movable laser beam can be performed with high precision, and high-precision beam scanning can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A beam position adjusting method for an optical scanning device using a galvano-mirror capable of altering an angle of a mirror surface by a drive control, and using a sensor that detects passage positions of a stationary light beam whose scanning position is fixed and a movable light beam whose scanning position is varied by adjusting the angle of the mirror surface of the galvano-mirror, the method comprising:

detecting a passage position of the stationary light beam on a light-receiving surface of the sensor;

determining a passage position of the movable light beam on the light-receiving surface of the sensor, relative to the detected passage position of the stationary light beam;

effecting a control to move the movable light beam to the determined passage position by adjusting the angle of the mirror surface of the galvano-mirror;

checking, upon completion of the control to move the movable light beam to the determined passage position, whether the movable light beam has moved to the determined passage position; and detecting once again the passage position of the stationary light beam, when the movable light beam has failed to move to the determined passage position.

2. The beam position adjusting method for an optical scanning device, according to claim 1, wherein a difference between the passage position of the stationary light beam and the passage position of the movable light beam, which is determined relative to the passage position of the stationary light beam, is determined according to a resolution.

3. The beam position adjusting method for an optical scanning device, according to claim 1, wherein when the movable light beam has successfully moved to the determined passage position, the control to move the movable light beam is finished.

4. The beam position adjusting method for an optical scanning device, according to claim 1, wherein when the movable light beam has successfully moved to the determined passage position, the control to move the movable light beam is finished and an image forming operation is controlled.

5. A beam position adjusting method for an optical scanning device using a galvano-mirror capable of altering an angle of a mirror surface by a drive control, and using a sensor that detects passage positions of a stationary light beam whose scanning position is fixed and a movable light beam whose scanning position is varied by adjusting the angle of the mirror surface of the galvano-mirror the method comprising:

detecting a passage position of the stationary light beam on a light-receiving surface of the sensor;

determining a passage position of the movable light beam on the light-receiving surface of the sensor, relative to the detected passage position of the stationary light beam;

effecting a control to move the movable light beam to the determined passage position by adjusting the angle of the mirror surface of the galvano-mirror;

detecting once again, upon completion of the control to move the movable light beam to the determined passage position, the passage position of the stationary light beam on the light-receiving surface of the sensor; and determining once again the passage position of the movable light beam on the light-receiving surface of the sensor relative to the passage position of the stationary light beam, when the detected passage position of the stationary light beam has changed, and effecting a control to move the movable light beam to the determined passage position.

6. The beam position adjusting method for an optical scanning device, according to claim 5, wherein when the detected passage position of the stationary light beam has not changed, the control to move the passage position of the movable light beam is finished.

7. The beam position adjusting method for an optical scanning device, according to claim 5, wherein when the detected passage position of the stationary light beam has not changed, the control to move the passage position of the movable light beam is finished and an image forming operation is controlled.

8. An optical scanning apparatus comprising:
a galvano-mirror capable of varying an angle of a mirror surface;
a stationary light beam whose scanning position is immovable;
a movable light beam whose scanning position is moved by an angular adjustment of the mirror surface of the galvano-mirror;
a sensor that detects passage positions of the stationary light beam and the movable light beam; and
control means for:
  (i) detecting a passage position of the stationary light beam on a light-receiving surface of the sensor;
  (ii) determining a passage position of the movable light beam on the light-receiving surface of the sensor, relative to the detected passage position of the stationary light beam;
  (iii) effecting a control to move the movable light beam to the determined passage position by adjusting the angle of the mirror surface of the galvano-mirror;
  (iv) checking, upon completion of the control to move the movable light beam to the determined passage position, whether the movable light beam has moved to the determined passage position; and
  (v) detecting once again the passage position of the stationary light beam, when the movable light beam has failed to move to the determined passage position.

9. An optical scanning apparatus comprising:
a galvano-mirror capable of varying an angle of a mirror surface;
a stationary light beam whose scanning position is immovable;
a movable light beam whose scanning position is moved by an angular adjustment of the mirror surface of the galvano-mirror;
a sensor that detects passage positions of the stationary light beam and the movable light beam; and
control means for:
  (i) detecting a passage position of the stationary light beam on a light-receiving surface of the sensor;
  (ii) determining a passage position of the movable light beam on the light-receiving surface of the sensor, relative to the detected passage position of the stationary light beam;
  (iii) effecting a control to move the movable light beam to the determined passage position by adjusting the angle of the mirror surface of the galvano-mirror;
  (iv) detecting once again, upon completion of the control to move the movable light beam to the determined passage position, the passage position of the stationary light beam on the light-receiving surface of the sensor; and
  (v) determining once again the passage position of the movable light beam on the light-receiving surface of the sensor relative to the passage position of the stationary light beam, when the detected passage position of the stationary light beam has changed, and effecting a control to move the movable light beam to the determined passage position.

10. An optical scanning apparatus comprising:
a galvano-mirror capable of varying an angle of a mirror surface;
a stationary light beam whose scanning position is immovable;
a movable light beam whose scanning position is moved by an angular adjustment of the mirror surface of the galvano-mirror;
a sensor that detects passage positions of the stationary light beam and the movable light beam; and
a controller configured to:
  (i) detect a passage position of the stationary light beam on a light-receiving surface of the sensor;
  (ii) determine a passage position of the movable light beam on the light-receiving surface of the sensor, relative to the detected passage position of the stationary light beam;
  (iii) effect a control to move the movable light beam to the determined passage position by adjusting the angle of the mirror surface of the galvano-mirror;
  (iv) check, upon completion of the control to move the movable light beam to the determined passage position, whether the movable light beam has moved to the determined passage position; and
  (v) detect once again the passage position of the stationary light beam, when the movable light beam has failed to move to the determined passage position.

11. An optical scanning apparatus comprising:
a galvano-mirror capable of varying an angle of a mirror surface;
a stationary light beam whose scanning position is immovable;
a movable light beam whose scanning position is moved by an angular adjustment of the mirror surface of the galvano-mirror;
a sensor that detects passage positions of the stationary light beam and the movable light beam; and
a controller configured to:
  (i) detect a passage position of the stationary light beam on a light-receiving surface of the sensor;
  (ii) determine a passage position of the movable light beam on the light-receiving surface of the sensor, relative to the detected passage position of the stationary light beam;
  (iii) effect a control to move the movable light beam to the determined passage position by adjusting the angle of the mirror surface of the galvano-mirror;
  (iv) detect once again, upon completion of the control to move the movable light beam to the determined passage position, the passage position of the stationary light beam on the light-receiving surface of the sensor; and
  (v) determine once again, the passage position of the movable light beam on the light-receiving surface of the sensor relative to the passage position of the stationary light beam, when the detected passage position of the stationary light beam has changed, and effect a control to move the movable light beam to the determined passage position.

* * * * *